US008760802B2

United States Patent
Rothermel et al.

(10) Patent No.: US 8,760,802 B2
(45) Date of Patent: Jun. 24, 2014

(54) SYSTEMS AND METHODS FOR PROCESSING MAGNETIC MEDIA WITH FIRST AND SECOND MAGNETIC GAPS ADJACENT OPPOSITE SIDES OF THE RECORDING LAYER

(71) Applicant: Imation Corp., Oakdale, MN (US)

(72) Inventors: Stephen J. Rothermel, Roseville, MN (US); Douglas W. Johnson, Stillwater, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 13/795,421

(22) Filed: Mar. 12, 2013

(65) Prior Publication Data

US 2013/0286510 A1 Oct. 31, 2013

Related U.S. Application Data

(60) Provisional application No. 61/638,832, filed on Apr. 26, 2012.

(51) Int. Cl.
*G11B 5/024* (2006.01)
*G11B 5/265* (2006.01)

(52) U.S. Cl.
USPC .............................. 360/118; 360/66; 360/121

(58) Field of Classification Search
USPC ............... 360/121, 77.12, 90, 251, 251.1, 66, 360/118, 122, 134
See application file for complete search history.

(56) References Cited

U.S. PATENT DOCUMENTS

| | | | |
|---|---|---|---|
| 4,493,779 A | 1/1985 | Kamiyama | |
| 4,493,874 A | 1/1985 | Kubo et al. | |
| 4,672,009 A | 6/1987 | Takahashi | |
| 4,690,768 A | 9/1987 | Kamiyama | |
| 4,975,791 A | 12/1990 | Eggebeen | |
| 5,132,860 A * | 7/1992 | Von Stein | 360/118 |
| 5,247,397 A | 9/1993 | Sato et al. | |
| 5,293,285 A * | 3/1994 | Leonhardt et al. | 360/95 |
| 5,572,392 A | 11/1996 | Aboaf et al. | |

(Continued)

FOREIGN PATENT DOCUMENTS

| | | |
|---|---|---|
| GB | 812 023 A | 4/1959 |
| JP | 1208712 A | 8/1989 |
| JP | 2009-020943 A | 1/2009 |
| SU | 1631598 A1 | 2/1991 |

OTHER PUBLICATIONS

Kryder, Mark H. "An Introduction to Magnetic Recording Heads," in: Hadjipanayis, George C., ed., *Magnetic Storage Systems Beyond 2000*, NATO Science Series, vol. 41, Netherlands, Kluwer Academic Publishers, 2001, pp. 449-466.

(Continued)

*Primary Examiner* — Jefferson Evans
(74) *Attorney, Agent, or Firm* — Dorsey & Whitney LLP

(57) ABSTRACT

A system comprises a magnetic medium with a first magnetic gap adjacent a first side and a second magnetic gap adjacent a second side, opposite the first magnetic gap. The first magnetic gap generates first longitudinal and perpendicular field components. The second magnetic gap generates second longitudinal and perpendicular field components. The first and second longitudinal field components are substantially aligned along a recording layer of the magnetic medium, and the first and second perpendicular field components are substantially opposed across the recording layer of the magnetic medium.

19 Claims, 4 Drawing Sheets

(56) References Cited

U.S. PATENT DOCUMENTS

| | | |
|---|---|---|
| 5,689,384 A | 11/1997 | Albrecht et al. |
| 6,021,013 A | 2/2000 | Albrecht et al. |
| 6,040,964 A | 3/2000 | Saliba |
| 6,282,051 B1 | 8/2001 | Albrecht et al. |
| 6,462,904 B1 | 10/2002 | Albrecht et al. |
| 6,542,325 B1 | 4/2003 | Molstad et al. |
| 6,647,613 B2 | 11/2003 | Beck et al. |
| 6,781,778 B1 | 8/2004 | Molstad et al. |
| 6,807,025 B1 | 10/2004 | Benakli et al. |
| 6,822,827 B1 * | 11/2004 | Heinz et al. .................. 360/118 |
| 6,824,817 B2 | 11/2004 | Araki et al. |
| 6,842,305 B2 | 1/2005 | Molstad et al. |
| 6,943,987 B1 | 9/2005 | Raymond et al. |
| 6,950,269 B1 | 9/2005 | Johnson |
| 6,972,931 B2 | 12/2005 | Rudi et al. |
| 7,002,763 B2 | 2/2006 | Bui et al. |
| 7,012,774 B2 | 3/2006 | Nakao et al. |
| 7,038,873 B2 | 5/2006 | Shimazaki et al. |
| 7,050,251 B2 | 5/2006 | Lundstrom |
| 7,054,101 B1 * | 5/2006 | Marion et al. .................. 360/90 |
| 7,072,133 B1 | 7/2006 | Yip et al. |
| 7,132,164 B2 | 11/2006 | Yamazaki et al. |
| 7,180,699 B1 | 2/2007 | Dee |
| 7,190,551 B2 | 3/2007 | Suda |
| 7,193,812 B2 | 3/2007 | Eaton |
| 7,206,167 B2 | 4/2007 | Beck et al. |
| 7,224,544 B2 | 5/2007 | Takano et al. |
| 7,381,482 B2 | 6/2008 | Yamazaki et al. |
| 7,436,622 B2 | 10/2008 | Johnson et al. |
| 7,515,374 B2 | 4/2009 | Nakao |
| 7,551,380 B2 | 6/2009 | Watson et al. |
| 7,623,310 B2 | 11/2009 | Nakao |
| 7,736,769 B2 | 6/2010 | Ajan |
| 7,864,487 B2 | 1/2011 | Cherubini et al. |
| 7,986,485 B2 | 7/2011 | Mckinstry et al. |
| 8,014,100 B2 | 9/2011 | Biskeborn et al. |
| 8,228,637 B2 | 7/2012 | Schaefer et al. |
| 8,254,052 B2 | 8/2012 | Dugas |
| 8,310,780 B2 | 11/2012 | Imaino et al. |
| 8,670,203 B2 | 3/2014 | Ohtsu et al. |
| 2003/0017364 A1 | 1/2003 | Kikitsu et al. |
| 2003/0095353 A1 | 5/2003 | Nakao |
| 2003/0099059 A1 | 5/2003 | Nakao |
| 2004/0080847 A1 | 4/2004 | Lundstrom |
| 2005/0099718 A1 | 5/2005 | Takano et al. |
| 2005/0122620 A1 | 6/2005 | Suda |
| 2005/0254170 A1 | 11/2005 | Dugas et al. |
| 2006/0126207 A1 | 6/2006 | Johnson et al. |
| 2006/0177702 A1 | 8/2006 | Ajan |
| 2007/0223126 A1 * | 9/2007 | Olson et al. .................. 360/48 |
| 2007/0230040 A1 | 10/2007 | Dugas et al. |
| 2007/0231609 A1 | 10/2007 | Ajan et al. |
| 2008/0024905 A1 | 1/2008 | Johnson et al. |
| 2008/0030899 A1 | 2/2008 | Norton |
| 2008/0049356 A1 | 2/2008 | Weber et al. |
| 2008/0158721 A1 | 7/2008 | Bui et al. |
| 2008/0304180 A1 | 12/2008 | Schaefer et al. |
| 2009/0040643 A1 | 2/2009 | Weng et al. |
| 2009/0046396 A1 | 2/2009 | Nagata et al. |
| 2009/0080108 A1 | 3/2009 | Watson et al. |
| 2009/0141393 A1 | 6/2009 | Vanderheyden et al. |
| 2010/0002335 A1 | 1/2010 | Dugas |
| 2010/0246057 A1 | 9/2010 | Mckinstry et al. |
| 2011/0102116 A1 | 5/2011 | Biskeborn et al. |
| 2011/0102936 A1 | 5/2011 | Sugiyama et al. |
| 2011/0141604 A1 | 6/2011 | Dugas et al. |
| 2011/0222187 A1 | 9/2011 | Biskeborn |
| 2012/0019954 A1 | 1/2012 | Imaino et al. |
| 2012/0050908 A1 * | 3/2012 | Ohtsu et al. .................. 360/66 |
| 2012/0050910 A1 * | 3/2012 | Ohtsu et al. .................. 360/77.12 |
| 2012/0194941 A1 | 8/2012 | Jubert |
| 2012/0314318 A1 * | 12/2012 | Olson et al. .................. 360/71 |
| 2012/0314319 A1 | 12/2012 | Olson et al. |
| 2012/0314320 A1 | 12/2012 | Olson et al. |
| 2012/0314322 A1 | 12/2012 | Olson et al. |
| 2013/0148235 A1 | 6/2013 | Ochi et al. |
| 2013/0286504 A1 * | 10/2013 | Rothermel et al. .......... 360/111 |

OTHER PUBLICATIONS

Cherubini, Giovanni, et al. "29.5-Gb/in$^2$ Recording Areal Density on Barium Ferrite Tape," *IEEE Transactions on Magnetics*, vol. 47, No. 1, pp. 137-147, Jan. 2011.

International Search Report dated Apr. 25, 2013, for PCT Application No. PCT/US2013/023816 filed Jan. 30, 2013.

International Search Report dated Aug. 13, 2012, for PCT Application No. PCT/US2012/042094 filed Jun. 12, 2012.

U.S. Appl. No. 13/795,668, filed Mar. 12, 2013, entitled "Methods and System for Magnetic Media Servo Writing".

U.S. Appl. No. 13/795,482, filed Mar. 12, 2013, entitled "Tapered Pole Heads for Magnetic Media".

U.S. Appl. No. 13/795,590, filed Mar. 12, 2013, entitled "Servo Write Head".

U.S. Appl. No. 13/754,078, filed Jan. 30, 2013, entitled "Perpendicular Pole Head for Servo Writing Magnetic Media".

* cited by examiner

SYSTEMS AND METHODS FOR PROCESSING MAGNETIC MEDIA WITH FIRST AND SECOND MAGNETIC GAPS ADJACENT OPPOSITE SIDES OF THE RECORDING LAYER

RELATED U.S. APPLICATION DATA

This application claims priority to U.S. provisional Application No. 61/638,832, filed Apr. 26, 2012, and incorporated herein by reference.

The subject matter of this application is also related to that of the following applications, each of which is incorporated by reference in its entirety for all purposes: U.S. non-provisional application Ser. No. 13/795,482, entitled TAPERED POLE HEADS FOR MAGNETIC MEDIA, filed on even date herewith, which claims priority to U.S. provisional Application No. 61/638,820, filed Apr. 26, 2012; U.S. non-provisional application Ser. No. 13/795,668, entitled METHODS AND SYSTEMS FOR MAGNETIC MEDIA SERVO WRITING, filed on even date herewith and issuing Feb. 4, 2014 as U.S. Pat. No. 8,643,968, which claims priority to U.S. provisional Application No. 61/638,767, filed Apr. 26, 2012; U.S. non-provisional application Ser. No. 13/795,590, entitled SERVO WRITE HEAD, filed on even date herewith, which claims priority to U.S. provisional Application No. 61/638,806, filed Apr. 26, 2012; and U.S. non-provisional application Ser. No. 13/754,078, entitled PERPENDICULAR POLE HEAD FOR SERVO WRITING MAGNETIC MEDIA, filed Jan. 30, 2013, which claims priority to U.S. provisional Application No. 61/620,199, filed Apr. 4, 2012.

BACKGROUND

Magnetic tape-based data storage systems provide secure, reliable, cost-efficient, and scalable data storage solutions for business, industry, and government service applications. Cartridge-based magnetic tape systems combine efficiency and ease of use in regulated bulk storage environments, and are adaptable for use with online, nearline, offline, and offsite infrastructures to relay large datasets, ensure regulatory compliance and safeguard critical information while lowering data storage costs and service time.

Magnetic tape systems provide high data storage densities and capacity, with adaptable performance criteria suitable for a wide range of backup, archiving, and portable data storage needs. As storage densities and access speeds increase, however, substantial engineering demands are made on the servo system, which must provide precise head positioning capability in order to quickly, accurately, and reliably read and write data to and from the data storage medium.

The storage medium itself is typically divided into alternating data storage and servo bands. Servo patterns are recorded onto the servo bands during the formatting or manufacturing process, and used to position the data heads during read and write operations. The servo control system uses servo heads to read the servo patterns, and performs a time-based pattern conversion to determine position. Based on the servo signal, the data heads can be precisely positioned along particular data tracks, as defined between adjacent servo bands.

Representative servo pattern and head positioning technologies are described in the following U.S. patent documents, each of which is incorporated by reference herein: Molstad et al., U.S. Pat. No. 6,542,325, TIME-BASED SERVO FOR MAGNETIC STORAGE MEDIA, issued Apr. 1, 2003, and assigned to Imation Corp. of Oakdale, Minn.; Molstad et al., U.S. Pat. No. 6,781,778, TIME-BASED SECTORED SERVO DATA FORMAT, issued Aug. 24, 2004, and assigned to Imation Corp. of Oakdale, Minn.; and Johnson et al., U.S. Pat. No. 6,950,269, SYSTEM AND METHODS FOR USING SERVOPOSITIONING SIGNALS, issued Sep. 17, 2005, and assigned to Imation Corp. of Oakdale, Minn. These servo pattern formation technologies and head positioning algorithms allow for narrower data track definitions along the data bands, and provide for more precise data head positioning over individual data tracks. As a result, data density and read/write reliability are increased.

To further improve performance, the magnetic medium may be erased (or degaussed) before writing the servo pattern. Depending on technique, degaussing can provide the magnetic medium with a more homogeneous or isotropic domain structure, improving read and write capability for both the servo patterns and data tracks. Erasure and degaussing techniques thus impact overall performance, particularly in high capacity magnetic media with increased data rates and storage density.

SUMMARY

Exemplary embodiments of the present disclosure include systems and methods for processing magnetic media. Exemplary systems may include a magnetic medium with a recording layer, and first and/or second magnetic gaps positioned adjacent opposite sides of the magnetic medium. The first magnetic gap generates a first longitudinal field component and a first perpendicular field component, and the second magnetic gap generates a second longitudinal field component and a second perpendicular field component. The first and second longitudinal field components may be substantially aligned along the recording layer, and the first and second perpendicular field components may be substantially opposed across the recording layer.

Exemplary methods may include positioning a first magnetic head having a first magnetic gap adjacent a first side of a magnetic medium and positioning a second magnetic head having a second magnetic gap adjacent a second side of the magnetic medium, opposite the first magnetic gap. The first and second magnetic heads may generate substantially aligned longitudinal field components along the magnetic medium, providing complementary longitudinal bias along the recording layer. The first and second magnetic heads may generate substantially opposed perpendicular field components across the magnetic medium, reducing perpendicular bias along the recording layer, as compared to the longitudinal bias. In additional to magnetic media with longitudinal and perpendicular bias, the exemplary systems and methods described here may also be applied to media with other magnetic domain, biasing and data storage formats.

DETAILED DESCRIPTION

Figure 1:
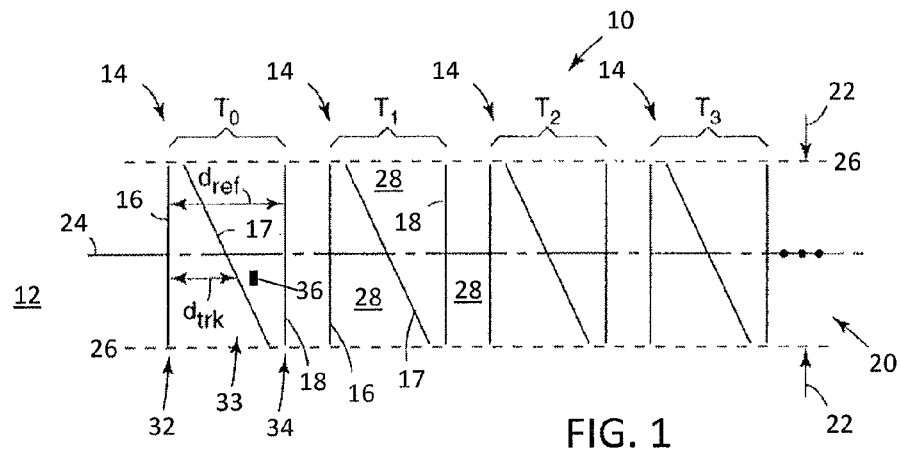
FIG. 1 is schematic illustration of a servo pattern in a magnetic recording medium, with reduced bias.

FIG. 1 is schematic illustration of servo data pattern 10 on magnetic recording medium 12. Magnetic recording medium 12 is shown in a top-down view, looking toward the magnetic storage surface. Pattern 10 is represented by repeated sets or frames 14 of pattern lines, for example three lines 16, 17, and 18 in an N-shaped pattern. A series of frames 14 are distributed along servo band (or track) 20, each with substantially identical pattern lines 16, 17, and 18, forming pattern 10 on magnetic medium 12.

Width 22 of band 20 is defined generally perpendicularly (or generally orthogonally) to center line 24 of pattern 10, between lateral edges or sides 26 (dashed lines). Sides 26 define the lateral boundaries of pattern lines 16, 17, and 18 in each frame 14.

Although lines 16, 17, and 18 are shown as individual pattern lines, in a preferred embodiment, each line can be recorded multiple times in parallel in each frame, such as about four or five or more times. This has the effect that line 16, recorded as four or five (or some other number) of lines, can be more easily recognized than a single line. Similarly, lines 17 and 18 can be recorded multiple times in parallel in each frame, with the effect that lines 17 and 18, recorded as four for five (or some other number) of lines, can be more easily recognized than a single line.

In one embodiment, magnetic domains in the magnetic media are randomized in a perpendicular direction (that is, orthogonal to a plane of the media) and are biased in a longitudinal direction (that is, along or opposite a media travel direction). As used herein, "random" includes effects that are pseudorandom and effects that are substantially unpredictable by applicable equipment. This can have the effects of providing a relatively more desirable appearance of the media output, and be relatively easier to integrate with known magnetic media technologies. For example, the magnetic domain structure may be substantially randomized in inter-pattern regions 28, between pattern lines 16, 17, and 18, and between individual frames 14. However, after reading this application, those skilled in the art would recognize that when using magnetic media with relatively greater coercivity, randomizing magnetization of data bands as well may become relatively more desirable.

Magnetic medium 12 is typically formed by binding a magnetic coating to a substrate or base film, for example a polymer such as polyethylene terephthalate (PET) or polyethylene naphthalate (PEN). A back coat may be applied to the surface opposite the magnetic coating, for example silicon dioxide or carbon black pigment particles (or both), in a blend of polymer resin or nitrocellulose binders to provide stiffness, reduce friction, dissipate static charge, and maintain uniform tape wind.

Typical magnetic coatings include magnetic particles or a magnetic powder in a binder such as a thermoplastic resin. The magnetic coating may also include a head cleaning agent (HCA) such as an alumina or aluminum oxide pigment particles, abrasive grains such as silica, or both, along with other resin or binder components such as surfactants, lubricants, and hardeners.

In the particular example of FIG. 1, magnetic medium 12 is configured for perpendicular recording, for example using a barium ferrite (BaFe) or other perpendicularly oriented magnetic recording layer with a soft magnetic underlayer (SUL) for flux return. Other materials may also be suitable, such as strontium ferrite (SrFe) or cobalt ferrite (CoFe), or a combination of one or more ferrite, ferromagnetic (FM), anti-ferromagnetic (AFM), synthetic anti-ferromagnetic (SAF) and soft underlayer materials, forming a layered perpendicular magnetic recording material.

Depending on application, servo pattern 10 may extend continuously along substantially the entire length of magnetic medium 12. Alternatively, pattern 10 may be provided in particular track sectors, for example at the beginning and end of magnetic (tape) medium 12, or in periodic locations along magnetic medium 12. In some applications, pattern 10 can be provided on non-tape-based magnetic media 12, for example a magnetic disc.

Pattern 10 may also represent more generalized data in a data band 20, for example generic binary data stored in either a perpendicular or longitudinal recording medium, such as a magnetic tape or a magnetic disc, or analog data on an analog medium. In these applications, reduced bias in magnetic medium 12 also reduces asymmetry in the signal from the data head (or read/write head), further improving system performance by increasing speed and reliability for data read and write operations.

Servo pattern lines 16, 17, and 18 can be simultaneously recorded in each servo frame 14 to reduce sensitivity to recording speed. For example, pattern lines 16, 17, and 18 in individual servo frames 14 may be written at times $t_0$, $t_1$, $t_2$, etc., as shown in FIG. 1. Thus, the geometry and relative positions of servo pattern lines 16, 17, and 18 can be substantially identical in each servo frame 14, spaced along magnetic medium 12 according to frame recording times $t_0$, $t_1$, $t_2$, etc. The frame recording times themselves may be periodic, or aperiodic.

As shown in FIG. 1, individual servo frames 14 each include three servo lines 16, 17, and 18, forming an "N" pattern. Reference lines 16 and 18 are recorded in first and second servo pattern reference regions 32 and 34, respectively, extending transversely or substantially perpendicularly to center line 24. Servo pattern line 17 extends diagonally across servo pattern region 33 at a skew angle with respect to center line 24, between first reference region 32 and second reference region 34. Servo pattern line 17 also makes a skew angle with respect to reference lines 16 and 18, forming the "N" shaped pattern ("|\|") of each servo frame 14.

Servo patterns 10 are written to magnetic medium 12 during the manufacturing or formatting process, and are used as a reference to position the data heads for reading and writing to data tracks over the life of the tape cartridge or other magnetic storage device. As magnetic medium 12 translates along center line 24 of band 20, read head 36 crosses a series of magnetic transitions at the leading and trailing edges of pattern lines 16, 17, and 18, generating a corresponding series of servo signals or servo read pulses.

Servo signal timing depends on the relative position and magnetic polarization states of servo pattern lines 16, 17, and 18. As shown in FIG. 1, reference lines 16 and 18 define reference distance $d_{ref}$, which can be relatively constant across width 22 of band 20. (While a relatively constant reference distance $d_{ref}$ can be preferred in many embodiments, in the context of the invention, there is no particular requirement for any such limitation.) Servo pattern line 17 defines tracking distance $d_{trk}$, which varies across width 22 of band 20.

The servo read pulses are defined by time intervals corresponding to reference distance $d_{ref}$ and tracking distance $d_{trk}$. The time intervals are used to generate a position signal for read head 36, based on the ratio $d_{trk}/d_{ref}$. As shown FIG. 1, for example, a lower ratio indicates a position toward the top of band 20, and a higher ratio indicates a position toward the bottom of band 20. The servo signals are used to position read/write (data) heads along data tracks in the data bands, extending between adjacent servo bands 20.

The servo pattern can be reversed, forming a "|/|" or "inverted N" servo frame. Alternatively, a two-line servo pattern is used, for example a "V" shape (either "\/" or "/\"). Other patterns include two, three or more different reference and servo pattern lines 16, 17, and 18. The servo lines can also have different shapes, for example using a combination of straight, curved, arcuate or chevron-shaped segments.

In longitudinal media, servo pattern lines 16, 17, and 18 represent regions where magnetic domains in the recording layer are preferentially oriented along the plane of magnetic medium 12, for example parallel or anti-parallel to the tracking direction. In perpendicular media, the magnetic domains are preferentially oriented in an orthogonal direction with respect to the recording layer, either into or out of the plane of magnetic medium 12. Because of this preferential domain orientation, it is beneficial to erase magnetic medium 12 before writing servo pattern 10, in order to reduce residual bias and obtain a servo read signal with symmetric amplitude (that is, with equal positive and negative signal excursions).

It should be recognized that the present invention may be used with any suitable type of tape or any suitable type of media, as desired. In particular, the techniques described here are not limited to magnetic tape-based digital storage media and magnetic disc storage media. In addition, these techniques are also suitable for use with other media where reduced (e.g. perpendicular) bias may be desired, including, but not limited to, analog audio tape, analog video tape and other analog media, pattern media, and other storage media.

To reduce bias in the position error signal (PES), or other signal from read head 36, the net magnetic moment (or bias) should be small in inter-pattern regions 28, so that transitions to both (e.g., perpendicular) polarity states are equally strong (that is, symmetric). Where magnetic medium 12 has a net bias (or non-zero moment), on the other hand, the transitions at pattern lines 16, 17, and 18 may be stronger (or enhanced) for one polarity as compared to the other. To reduce or minimize such signal bias and asymmetry effects, magnetic medium 12 is processed with increased longitudinal bias, and reduced perpendicular bias.

Figure 2:
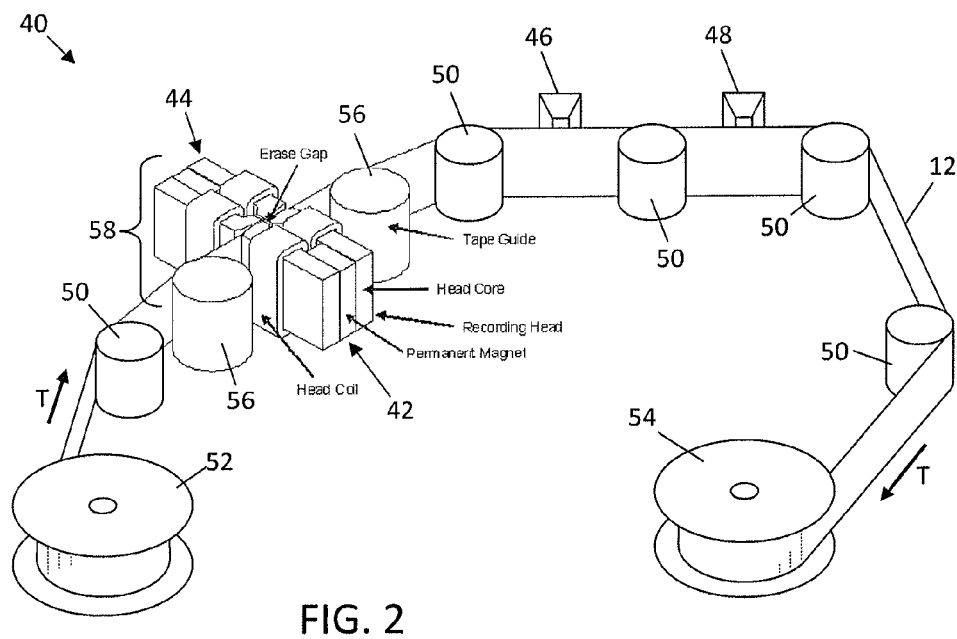
FIG. 2 is a schematic view of a system for reducing bias in a servo or data pattern.

FIG. 2 is a schematic view of system 40 for processing magnetic (e.g., tape) medium 12, with reduced bias in recording layer 12A. In this particular example, system 40 includes first and second magnetic elements (or heads) 42 and 44, write head 46, read head 48, and guides 50. Depending on application, system 40 may also include other components for processing magnetic medium 12, including, but not limited to, tension control devices, vacuum columns, polishing and cleaning elements, and additional heads or other magnetic components for further read, write, erase, and formatting operations on magnetic medium 12. Alternatively, system 40 operates on a non-tape based magnetic medium 12, for example a magnetic disc, pattern media or a magnetoresistive medium.

Guides (or rollers) 50 guide magnetic medium 12 through system 40 along media travel direction T (arrows), from supply reel 52 to takeup reel 54. Head assembly 58 includes DC bias elements (magnetic heads, or erase heads) 42 and 44 on opposite sides of magnetic medium 12, for example at substantially the same longitudinal position along media travel direction T.

Positioning guides 56 position magnetic medium 12 between heads 42 and 44, where the magnetic field has a large-magnitude longitudinal component (in the plane of magnetic medium 12), and a relatively small or near-zero perpendicular component (out of the plane of magnetic medium 12). System 40 thus produces high longitudinal magnetization (or bias) in magnetic medium 12, with reduced or minimized perpendicular magnetization (or bias), as compared to the longitudinal component. As a result, write head 46 generates reduced-bias servo tracks and other data patterns on magnetic medium 12, with improved signal-to-noise ratio and reduced or minimized signal bias and asymmetry from read head 48.

Figure 3:
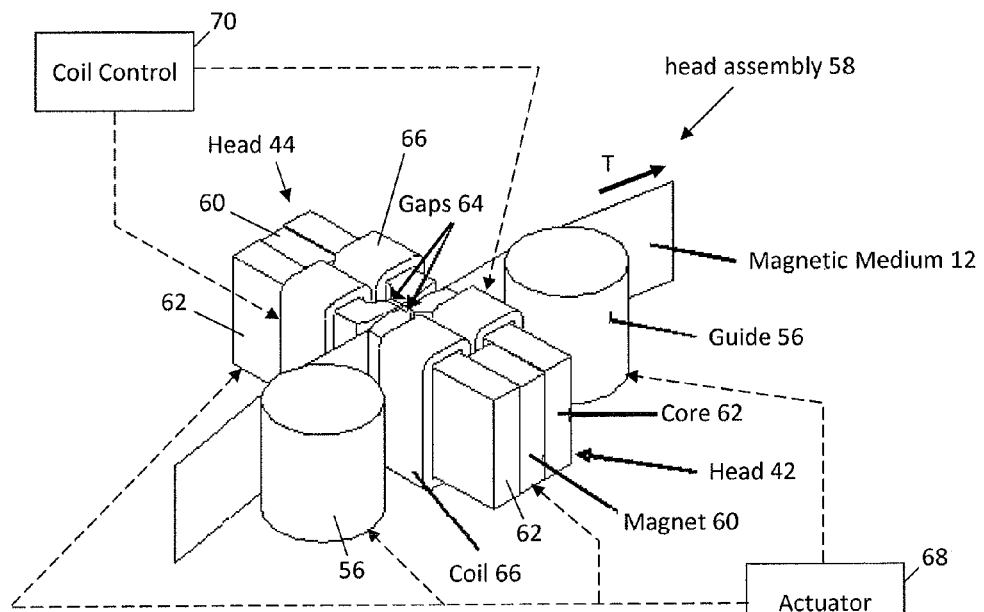
FIG. 3 is a schematic view of a magnetic head assembly for reducing bias in a magnetic medium.

FIG. 3 is a schematic view of magnetic head assembly 58 for reduced bias processing of magnetic medium 12, for example in magnetic tape processing system 40 as described above. Head assembly 58 includes magnetic elements (or heads) 42 and 44 and guides 56 for positioning magnetic medium 12 between heads 42 and 44.

Heads 42 and 44 are positioned on opposites sides of magnetic medium 12, at substantially the same longitudinal position along tracking direction T. Magnetic medium 12 may be oriented in either direction within assembly 12; that is, with the recording layer facing head 44, and the back coat facing head 42, or with the recording layer facing head 44, and the back coat facing head 44. Similarly, one or more guides 56 may be positioned on either or both sides of magnetic medium 12, and tracking direction T (arrow) may be taken in either direction through head assembly 58.

Heads 42 and 44 each may include one or more of magnetic field elements 60, magnetic core elements 62, magnetic gaps 64, and coils 66. Magnetic field elements (or magnets) 60 provide sources of magnetic flux, for example in the form of permanent iron, ferrite, alnico or rare earth magnets. Example rare earth magnets can include neodymium and samarium-cobalt.

The magnetic flux is guided through magnetic core or yoke elements 62. Core elements 62 are typically formed of a high permeability, low coercivity, high saturation magnetic material such as a ferromagnetic alloy, in order to provide high flux density at magnetic gaps 64.

Actuator 68 may be provided to manually or automatically position one or more of magnetic head 42, magnetic head 44 and guides 56, in order to maintain or adjust the position of magnetic medium 12 between heads 42 and 44. Actuator 68 may also be utilized to align magnetic gaps 64 in opposing locations along the opposite sides of magnetic medium 12.

Magnetic gaps 64 may be formed as air gaps, or filled with a nonmagnetic insulating material such as glass, silica, or alumina. Alternatively, gaps 64 may be formed of a nonmagnetic metal such as titanium, or a copper alloy.

Coils 66, which may be formed of an electrically conducting material such as copper, may be provided to generate additional flux across gaps 64 when energized by a coil current. Coils 66 may be wrapped around magnetic core elements 62. Coil control 70 may be provided to manually or automatically regulate the current in coils 66. Generally, the flux scales with coil current I, until core elements 62 reach saturation.

In some designs, magnetic field element 60 is omitted or replaced with additional magnetic core or yoke elements 62, and coils 66 act as the primary source of magnetic flux for one or both of heads 42 and 44. Alternatively, coil 66 is omitted and magnetic field elements 60 act as the primary source of flux for one or both of magnetic heads 42 and 44. In these various configurations, one or both of magnetic heads 42 and 44 may function as a permanent, fixed-field magnetic element, as electromagnetic, variable-field magnetic element, or as a combination thereof.

As magnetic field lines cross gaps 64, magnetic flux enters magnetic medium 12 to alter the magnetic domain structure of the recording layer. As shown in FIG. 3, magnetic gaps 64 are positioned symmetrically about magnetic medium 12, with one gap 64 on either side of magnetic medium 12, so that gaps 64 overlap at substantially the same longitudinal position along tracking direction T.

In addition, gaps 64 may have substantially the same gap length (sometimes known as "gap width") and geometry, and substantially the same flux density. This results in a symmetric field distribution across magnetic medium 12, with a relatively large longitudinal field component and a relatively small perpendicular field component. Magnetic medium 12 is thus provided with enhanced longitudinal bias and reduced or minimized perpendicular bias, for improved erasure and read and write operations on servo patterns and other data, as described above.

In alternative embodiments, one or more heads 42 may have a coating applied, such as at one or more gaps 64 or otherwise where those one or more heads 42 meet the magnetic medium 12. The coating can have a shape and structure that guides the magnetic medium 12, such as to control a spacing between the one or more heads 42 and the magnetic medium 12. For a first example, the coating may be applied as an adhesive tape with a wear resistant coating, such as an ultra-high density polyethylene. For a second example, the coating may be applied like a ceramic. For a third example, the coating may include a ceramic or similar substance and adhered to the one or more heads 42. For a fourth example, the coating may include a non-magnetic (or at least, non-ferromagnetic) metallic coating or element. Other coatings also may be used.

Figure 4:
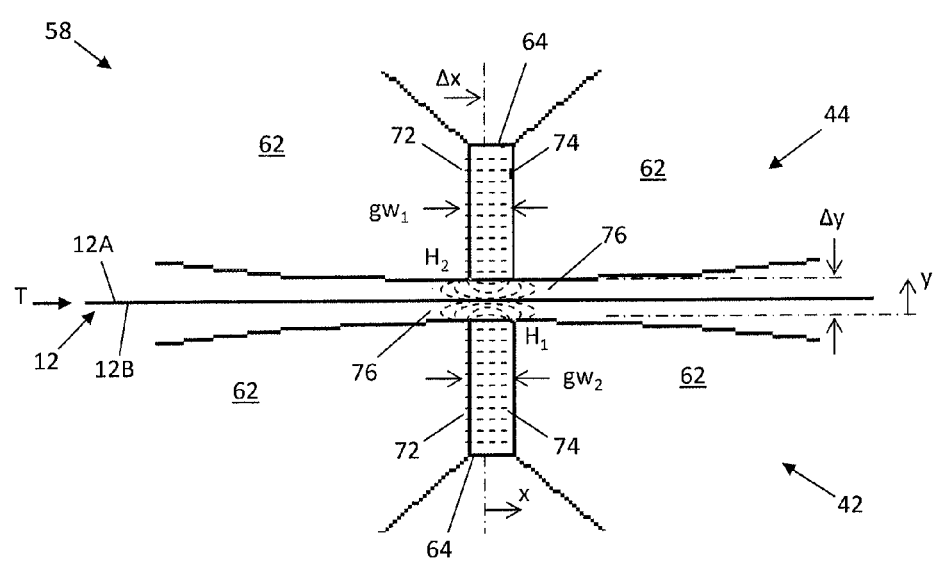
FIG. 4 is a schematic view of a gap structure for the magnetic head assembly, illustrating the field structure across the magnetic medium.

FIG. 4 is a schematic view of head assembly 58, illustrating the magnetic field structure along recording layer 12A of magnetic medium 12, adjacent magnetic gaps 64. Magnetic head 42 has gap 64 with gap length $gw_1$, spaced at transverse (that is, perpendicular to the tape direction, along the tape) distance $y_1$ from recording layer 12A of magnetic medium 12. Magnetic head 44 has gap 64 with gap length $gw_2$, spaced at transverse distance $y_2$ from recording layer 12A.

The longitudinal field direction (x axis) lies in plane of recording layer 12A, for example along tracking direction T, measured from the middle of gap 64 on head 42 as shown in FIG. 4 (bottom). The transverse field direction (axis y) is perpendicular (or orthogonal) to the longitudinal direction, and substantially perpendicular to the plane of recording layer 12A, measured from the top of gap 64 on head 42 (right-hand side).

Gap lengths $gw_1$ and $gw_2$ are measured along the longitudinal (x direction) across gaps 64 between pole faces 72 and 74 of magnetic heads 42 and 44, respectively. Pole faces 72 and 74 are defined along the opposing faces of core elements 62, facing gaps 64.

Because longitudinal positions (x) are measured from the center (or midline) of gap 64 on head 42, head 42 by definition has gap position x=0. The gap position (midline) for head 44 is $\Delta x$, as defined with respect to gap position x=0 for gap 64 on head 42. Longitudinal gap spacing $\Delta x$ may be positive, negative, or substantially zero, as defined between gaps 64 on heads 42 and 44.

Transverse positions (y) are measured from the top of gap 64 on head 42, facing (and nearest) magnetic medium 12. The transverse gap spacing between head 42 and head 44 is $\Delta y$, as defined by the shortest distance along the y axis from gap 64 on head 42 to gap 64 on head 44.

The gap-media spacing for head 42 may be defined to be y, measured from the top of gap 64 on head 42 to the middle of recording layer 12A. In this convention, the gap-media spacing for head 42 is $\Delta y - y$. Note, however, that the positions of heads 42 and 44 are merely representative, and the choice of coordinate frames is arbitrary.

For example, the positions and coordinate descriptions of heads 42 and 44 may be reversed, without loss of generality. Thus, head 42 may face back coat 12B and head 44 may face recording layer 12A, or head 42 may face recording layer 12A and head 44 may face back coat 12B. In addition, heads 42 and 44 may also be described with other coordinate frames and systems, as known in the art.

As shown in FIG. 4, magnetic heads 42 and 44 have substantially symmetric magnetic fields $H_1$ and $H_2$, respectively, in the region between gaps 64, with plane of symmetry defined by reflection across recording layer 12A of magnetic medium 12. In particular, longitudinal component $H_{x1}$ of magnetic field $H_1$ is substantially equal to longitudinal component $H_{x2}$ of magnetic field $H_2$. That is:

$$H_{x1} \approx H_{x2}, \qquad [1]$$

as defined in inter-head (or inter-gap) region 76, between heads 42 and 44 and adjacent gaps 64.

Conversely, transverse component $H_{y1}$ of magnetic field $H_1$ is substantially opposed or opposite to transverse component $H_{y2}$ of magnetic field $H_2$. Thus:

$$H_{y1} \approx -H_{y2}, \qquad [2]$$

as defined in inter-head region 76.

As a result, the net magnetic field $H = H_1 + H_2$ is substantially longitudinal in the inter-gap region, with relatively large longitudinal component $H_x$, given by:

$$H_x = H_{x1} + H_{x2} \approx 2 H_{x1}, \qquad [3]$$

and relatively small transverse component $H_y$, given by:

$$H_y = H_{y1} + H_{y2} \approx 0 \qquad [4]$$

To determine appropriate ranges and tolerances for the gap length, spacing and other parameters of magnetic heads 42 and 44, the field strengths may be determined by numerical analysis. The numerical (magnetic field) analysis determines the bias fields along magnetic medium 12, and the bias fields determine the magnetic properties of recording layer 12A. That is, the field analysis (and field equations) define relationships between the magnetic and geometrical structures of head assembly 58, and the desired properties of magnetic medium 12 and recording layer 12A.

In the Karlqvist approximation, the longitudinal (x) and transverse or perpendicular (y) components of magnetic field $H_1$ (for magnetic head 42) are:

$$H_{x1} = \left(\frac{H_{01}}{\pi}\right)\left[\arctan\left(\frac{x + \frac{gw_1}{2}}{y}\right) - \arctan\left(\frac{x - \frac{gw_1}{2}}{y}\right)\right] \qquad [4]$$

and $$H_{y1}\left(\frac{H_{01}}{2\pi}\right)\left\{-\ln\left[\left(\frac{x + \frac{gw_1}{2}}{y}\right)^2 + 1\right] + \ln\left[\left(\frac{x + \frac{gw_1}{2}}{y}\right)^2 + 1\right]\right\}, \qquad [5]$$

where $H_{01}$ is the "deep gap" field inside gap 64 of magnetic head 42.

For magnetic field $H_2$ (of magnetic head 44), the components are:

$$H_{x2} = \left(\frac{H_{02}}{\pi}\right)\left[\arctan\left(\frac{x - \Delta x + \frac{gw_1}{2}}{\Delta y - y}\right) - \arctan\left(\frac{x - \Delta x - \frac{gw_1}{2}}{\Delta y - y}\right)\right] \quad [3]$$

and $$H_{y2}\left(\frac{H_{02}}{2\pi}\right)\left\{+\ln\left[\left(\frac{x - \Delta x + \frac{gw_1}{2}}{\Delta y - y}\right)^2 + 1\right] - \ln\left[\left(\frac{x - \Delta x + \frac{gw_1}{2}}{\Delta y - y}\right)^2 + 1\right]\right\}, \quad [4]$$

where $H_{02}$ is the corresponding deep gap field inside gap 64 of magnetic head 44.

In a simple linear superposition:

$$H_x = H_{x1} + H_{x2} \quad [5]$$

and $$H_y = H_{y1} + H_{y2}. \quad [6]$$

This approximation neglects head-head magnetic interactions, which would tend to increase longitudinal field component $H_x$.

Based on these field equations, different design options are available to achieve field symmetry, reduced bias in recording layer 12A of magnetic medium 12, or both. First, to the extent that magnetic heads 42 and 44 are magnetically symmetric, fields. $H_1$ and $H_2$ are also symmetric. That is, if heads 42 and 44 have substantially similar or the same deep gap fields $H_{01} \approx H_{02}$, and substantially similar or the same gap lengths $gw_1 \approx gw_2$, then fields $H_1$ and $H_2$ will have symmetric properties, and may provide recording layer 12A with reduced bias.

In addition, if heads 42 and 44 are aligned with gaps 64 in substantially the same longitudinal position along the tracking direction (that is, gap spacing $\Delta x \approx 0$), and recording layer 12A of magnetic medium 12 is positioned midway between the heads (with head-media spacing $y \approx \Delta y/2$), this is one way that the symmetry conditions of Equations 1 and 2 may be met.

That is, a symmetric head configuration corresponds to a symmetric magnetic field configuration, with a relatively large and complementary longitudinal bias along recording layer 12A, based on the relatively high longitudinal field strength ($H_x = H_{x1} + H_{x2} \approx 2H_{x1}$). At the same time, the symmetric head and field configuration generates a relatively small perpendicular bias along recording layer 12A, based on the opposed transverse fields ($H_y = H_{y1} + H_{y2} \approx 0$).

In practical applications, symmetry is not exact, and there is some tolerance in the design of head assembly 58 based on the design goals for the magnetic field structure. In particular, one goal is to have a net longitudinal magnetic field $H_x$ sufficient to erase recording layer 12A of magnetic medium 12. Another goal is to have a transverse or perpendicular magnetic field $H_y$ small enough to reduce or minimize perpendicular bias in recording layer 12A of magnetic medium 12.

The features of head assembly 58 are selected to meet one or both of these goals based on the magnetic properties of recording layer 12A and magnetic heads 42 and 44, including deep gap fields $H_{01}$ and $H_{02}$, which scale the magnitudes of the field components according to Equations 4-7. The properties of heads 42 and 44 that influence magnetic flux density and field strength at magnetic gaps 64 include, but are not limited to, the flux density generated by magnetic field elements 60, the flux density generated by current in coils 66, and the saturation value of magnetic core elements 62. The relevant geometrical properties of magnetic heads 42 and 44 that influence magnetic flux density and field strength at recording layer 12A include, but are not limited to, gap lengths $gw_1$ and $gw_2$, inter-gap spacing $\Delta x$, inter-head spacing $\Delta y$, and head-media spacings $y$ and $\Delta y - y$, as defined for magnetic head 42 and magnetic 44, respectively.

Table 1 gives a range of representative parameters for magnetic head assembly 58. As shown in Table 1, gap lengths $gw_1$ and $gw_2$ of individual heads 42 and 44 may scale over various ranges from about 0.2 to about 1.0 mm (and to larger values, such as about 10 mm or more), including about 0.5 mm, with a tolerance of ±about 0.1 mm. These values are suitable for a range of magnetic tape media 12, for example half-inch (0.5 in) or 12.7 mm magnetic tape. Alternatively, gap lengths $gw_1$ and $gw_2$ may be somewhat smaller, for example ≤about 0.1 mm, or somewhat larger, for example ≥about 1.0 mm, as adaptable for magnetic media 12 with different forms and geometries, for example a different width or thickness magnetic tape, or a magnetic disc, pattern media or a magnetoresistive medium 12.

Head spacing $\Delta y$ between magnetic heads 42 and 44 may scale over similar ranges, from about 0.2 to about 1.0 mm, with a tolerance of ±about 0.1 mm. In these dimension ranges, field parameters are less sensitive to small variations in position, within or less than the tolerance. Alternatively, the smallest practical head spacing in some configurations is about twice the thickness of the magnetic medium, for example about 6 to about 9 μm for advanced half-inch magnetic tape designs. In these small scale (small head spacing) configurations, head spacing $\Delta y$ may range down to about 20 μm or more, with a tolerance of about 10 μm.

TABLE 1

Representative Magnetic Head Parameters

| Parameter | Value | Tolerance |
|---|---|---|
| Gap Length | 0.2, 0.5, 0.6 or 0.8 mm | ±0.1 mm |
| ($gw_1$, $gw_2$) | 0.2-0.5 mm | ±0.1 mm |
| | 0.4-0.6 mm | ±0.1 mm |
| | 0.5-1.0 mm | ±0.1 mm |
| Head Spacing | 0.2, 0.5, 0.6 or 0.8 mm | ±0.1 mm |
| ($\Delta y$) | 0.2-0.5 mm | ±0.1 mm |
| | 0.4-0.6 mm | ±0.1 mm |
| | 0.5-1.0 mm | ±0.1 mm |
| | ≥20 μm | ±10 μm |
| Head-Media Spacing | ≤$\Delta y$ | ±0.1 mm |
| ($y$, $\Delta y - y$) | ≈$\Delta y/2$ | ±0.05 mm |
| | ≈$\Delta y/2$ (low tolerance) | ±10 μm |
| Gap Spacing | $\Delta x \leq 0.1$ or 0.2 mm | ±0.1 mm |
| ($\Delta x$) | $\Delta x \leq 1/2 (gw_1 + gw_2)$ | ±0.1 mm |
| | $\Delta x \leq (gw_1 + gw_2)$ | ±0.1 mm |
| | $\Delta x \geq (gw_1 + gw_2)$ | ±0.1 mm |
| Longitudinal Field | 1500-2500 G | ±500 G |
| ($H_x$) | 3200 G | ±200 G |
| | 3-5 kG | ±1 kG |
| | 10-20 kG | ±5 kG |

The head-media spacing ($y$ for head 42, $\Delta y - y$ for head 44) scales with head spacing $\Delta y$, which represents the practical upper limit (e.g., $y \leq \Delta y$). Moreover, recording layer 12A of magnetic medium 12 may be centered between heads 42 and 44, with about same spacing ($\Delta y/2$) on either side. In larger-scale (higher tolerance) head assemblies 58, the tolerance on the media-head spacing may range up to about 0.1 mm, and in smaller-scale (lower tolerance) head assemblies 58, the tolerance may range down to about 10 μm.

Depending on the field configuration of magnetic heads 42 and 44, an actuator may also used to reposition magnetic medium 12 with respect to heads 42 and 44 (or to reposition heads 42 and 44 with respect to magnetic medium 12). In these applications, recording layer 12A of magnetic medium 12 may be positioned in a region of more uniform field, lower perpendicular bias, or both, with asymmetric head-media spacing y≠Δy/2.

Gap spacing Δx generally scales lower with gap lengths gw$_1$ and gw$_2$. In some designs, for example, gap spacing Δx is as small or smaller than gap lengths gw$_1$ and gw$_2$, for example with symmetric gap lengths gw$_1$≈gw$_2$ of about 0.5±about 0.1 mm, and gap spacing Δx equal to or less than about 0.1 to about 0.2 mm. In this configuration, gaps 64 may substantially align across magnetic medium 12; that is, in approximately the same longitudinal position along tracking direction T. Alternatively, gap spacing Δx is less than or equal to the mean of gap lengths gw$_1$ and gw$_2$; that is $$\Delta x \leq \frac{gw_1 + gw_2}{2}. \quad [7]$$

In this configuration, gaps 64 may not necessarily be aligned, but may still physically overlap one another along tracking direction T, in an opposite configuration across magnetic medium 12. In other designs, gaps 64 may be somewhat misaligned from head 42 to head 44, with gap spacing Δx less than or equal to about twice the mean gap length, or greater than twice the mean gap length.

Longitudinal field H$_x$ scales with the deep gap field (H$_{01}$ and H$_{02}$), which in turn is limited by the magnetic properties of head elements 60 and 62, including the saturation flux density. For ferrite materials, saturation densities range up to about 3,000 to about 5,000 gauss (3-5 kG). Depending on the gap and head spacing geometry, the longitudinal field contribution from each head 42, 44 may range from about one quarter to one half of the deep gap field, so the (net) longitudinal field can range from about half the value of (individual) deep gap field H$_{01}$, H$_{02}$ (that is, about 1,500 to about 2,500 G), to about the deep gap field strength (from 3-5 kG). Other materials such as Permalloy and other nickel-iron or cobalt-iron alloys may also be used, with saturation densities of up to about 10 to about 20 kG, and correspondingly higher longitudinal field strengths (see Table 1).

Figure 5:
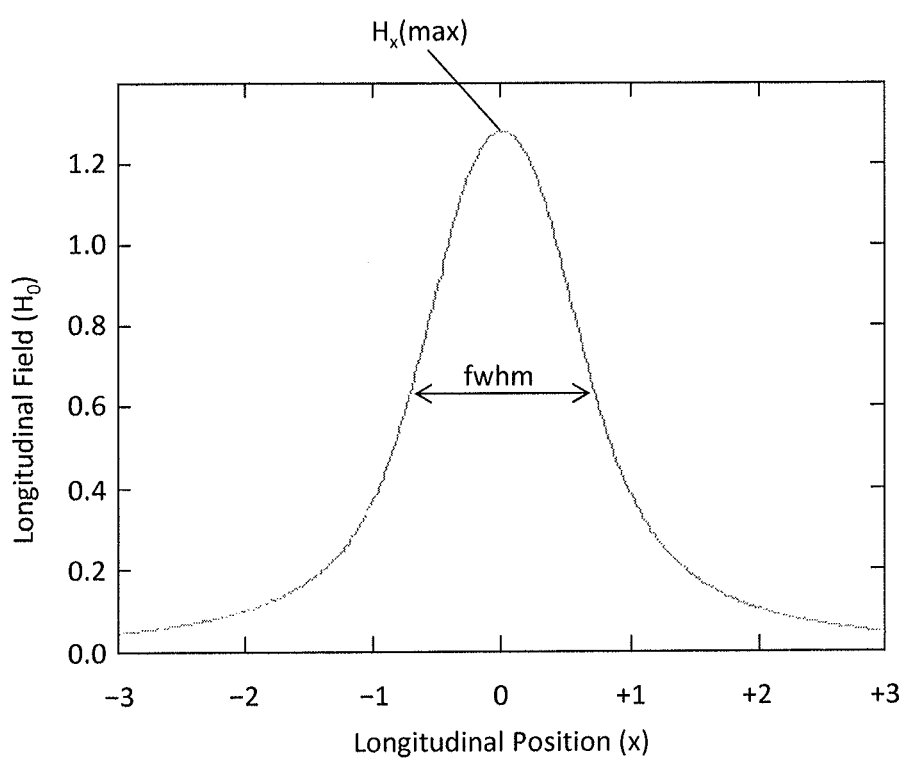
FIG. 5 is a representative plot of longitudinal field strength for the magnetic gap structure of FIG. 4.

FIG. 5 is a representative plot of longitudinal field strength for reduced-bias head assembly 58, for example using the magnetic gap structure of FIG. 4. The longitudinal component (H$_x$) of the magnetic field is plotted on the vertical axis, in arbitrary units. The longitudinal position (x) is plotted along the horizontal axis, also in arbitrary units.

In the particular example of FIG. 5, magnetic heads 42 and 44 have a substantially symmetric configuration, with approximately the same gap lengths gw$_1$≈gw$_2$ (written as the mean gap length, gw) and deep gap fields H$_{01}$≈H$_{02}$ (written as the mean deep gap field, H$_0$). The tolerances with respect to mean gap length gw and mean deep gap field H$_0$ vary, for example with each head 42, 44 within about 10% or less of the mean values, or within about 5%, about 2%, or about 1% of the mean values.

Heads 42 and 44 may overlap across magnetic medium 12, with gap spacing Δx≤gw, and heads 42 and 44 may be substantially aligned along tracking direction T, with gap spacing Δx≈0. The tolerance in gap spacing Δx generally scales with mean gap length gw, for example within about 20% or about 10% of mean gap length gw, or less than about 5% of mean gap length gw. Alternatively, the tolerance in gap spacing Δx is absolute, for example ±about 0.1 mm, or ±about 0.05 mm.

The longitudinal field strength (H$_x$) in FIG. 5 is plotted along recording layer 12A of magnetic medium 12, which is positioned approximately midway between heads 42 and 44 in this example. Thus, the first and second head-media spacings are each approximately Δy/2, as described above. For an average inter-head spacing of about Δy=about 0.5±about 0.1 mm, this corresponds to an average head-media spacing of Δy/2=about 0.25±about 0.05 mm. Alternatively, the tolerance in the media-head spacing (y or Δy–y) is less, for example about 10%, about 5%, about 2%, or about 1% of head-head spacing Δy.

As shown in FIG. 5, longitudinal field H$_x$ has a peaked distribution, with maximum value H$_x$(max) at approximately x=0. Where heads 42 and 44 are substantially aligned across magnetic medium 12, this corresponds to the center of magnetic gaps 64, as defined along tracking direction T between magnetic head 42 and magnetic head 44.

The maximum longitudinal field, H$_x$(max), scales with deep gap fields H$_{01}$ and H$_{02}$. In one particular design, for example, with symmetric media-head spacing Δy/2 and head/gap spacing Δy≈gw, the maximum longitudinal field component is approximately equal to the average deep gap field; that is, H$_x$(max) H$_0$. In this application, the tolerance in field strength may be about 10 to about 20% or less of the average deep gap field, for example with H$_x$(max)=H$_0$ within a tolerance of about 20%, about 10%, about 5%, about 2%, or about 1%, depending in part on tolerances of the magnetic head parameters.

Alternatively, the peak longitudinal field also varies with average (or common) gap length gw, and with individual gap lengths gw$_1$ and gw$_2$. The peak longitudinal field also varies with average media-head spacing Δy/2, and individual media-head spacings y and Δy–y. Thus, the peak (or maximum) longitudinal field magnitude may be greater than the average deep gap field, for example up to twice the deep gap field (H$_0$<H$_x$(max)≤2H$_0$), or more than twice the deep gap field (2H0<H$_x$(max)). The peak longitudinal field may also be less than the deep gap field, for example as little as half the deep gap field (½H$_0$≤H$_x$(max)<H$_0$), or less than half the deep gap field (H$_x$(max)<½H$_0$). In general, the flux should not exceed about twice the deep gap field in air, unless the magnetic medium has a permeability sufficiently greater than air to redirect enough flux to exceed about twice the deep gap field. However, in the context of the invention, there is no particular reason for this to impose any particular limitation.

The full width at half maximum (fwhm) also varies with gap and head-head spacing geometry. In a symmetric configuration with head-head spacing about equal to the average gap length (Δy≈gw), the full width at half maximum extends over about 1 to about 2 times the common gap length (that is, gw≤fwhm≤2 gw). Alternatively, the distribution is more sharply peaked, with a full width at half maximum of less than the common gap length (fwhm<gw), or the distribution is less sharply peaked, with a full width at half maximum greater than twice the common gap length (fwhm>2 gw).

Heads 42 and 44 are configured to enhance the longitudinal field component (H$_x$) and reduce or minimize the net perpendicular field component (H$_y$), as described above. Thus, perpendicular field component H$_y$ is substantially less than longitudinal component H$_x$ along recording layer 12A of magnetic medium 12, through inter-head region 76 between magnetic heads 42 and 44, and in particular along magnetic medium 12 adjacent magnetic gaps 64. As a result, there is substantially less perpendicular bias along recording layer 12A in this region, as compared to the longitudinal bias.

The actual value of perpendicular field strength H$_y$ depends upon the magnetic symmetry between fields H$_1$ and H$_2$, as compared to the variations in individual gap lengths gw$_1$ and gw$_2$, deep gap fields H$_{01}$ and H$_{02}$, and head-media spacing y (and Δy–y). In static, symmetric head designs, for example, perpendicular field $H_y$ may remain less than about 10% of maximum longitudinal field component $H_x(max)$ along recording layer 12A, through inter-head region 76. Alternatively, perpendicular field $H_y$ may remain less than about 5% of maximum longitudinal field component $H_x(max)$, or less than about 2%, or less than about 1% of maximum longitudinal field component $H_x(max)$.

In some designs, coil control 70 is used to select or adjust the current provided to coils 66 for one or both of magnetic heads 42 and 44, in order to reduce or minimize the perpendicular bias ($H_y$) along recording layer 12A by balancing perpendicular field components $H_{y1}$ and $H_{y2}$, while maintaining sufficient longitudinal bias ($H_x$) for full erasure of magnetic medium 12A. In additional designs, actuator 68 is used to adjust the position or orientation of one or more of head 42, head 44 and guides 56, in order to locate recording layer 12A in a position of reduced or minimum perpendicular magnetic bias between opposing magnetic gaps 64 of head 42 and head 44, respectively.

Figure 6:
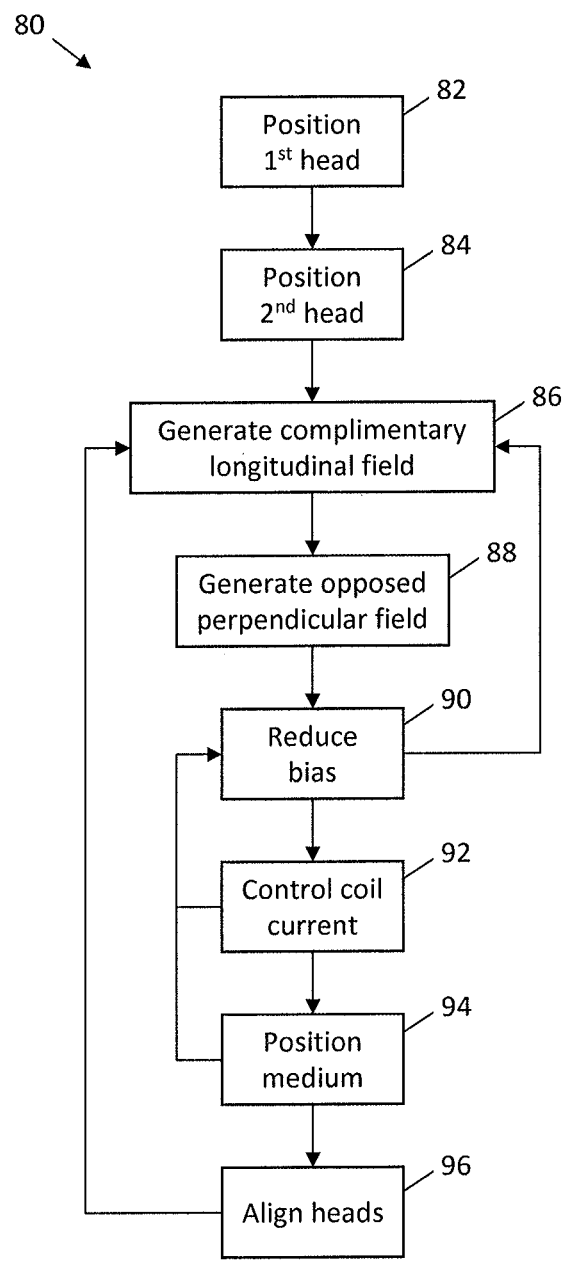
FIG. 6 is a block diagram of a method for reducing bias in a magnetic medium.

FIG. 6 is a block diagram of method 80 for reducing bias in a magnetic recording medium, for example using system 40 to process magnetic medium 12, as described above. Method 80 includes positioning a first magnetic head (step 82), positioning a second magnetic head (step 84), generating complimentary longitudinal field components (step 86), and generating opposed perpendicular field components (step 88), in order to reduce bias (step 90) in the magnetic medium. In some applications, method 80 also includes one or more of controlling a coil current (step 92), positioning the magnetic medium (step 94), and aligning the magnetic heads (step 96).

Positioning a first magnetic head (step 82) includes positioning the head with a magnetic gap adjacent the magnetic medium, for example with magnetic gap 64 of magnetic head 42 facing back coat 12B, opposite recording layer 12A. Positioning a second head (step 84) includes positioning the second head opposite the first head, for example with magnetic gap 64 of head 44 facing recording layer 12A. Alternatively, the heads may be reversed.

Generating complimentary longitudinal fields (or field components) (step 86) is achieved by generating magnetic fields $H_1$ and $H_2$ in the same general direction across magnetic gaps 64 in magnetic heads 42 and 44, respectively, so that longitudinal field components $H_{x1}$ and $H_{x2}$ are oriented in substantially the same direction along recording layer 12A of magnetic medium 12. For example, the longitudinal field components may align substantially along tracking direction T adjacent magnetic gaps 64 of heads 42 and 44, or the longitudinal field components may align substantially opposite tracking direction T.

Generating opposed perpendicular fields (or field components) (step 88) is achieved where the perpendicular components of magnetic fields H1 and H2 are oriented in substantially opposite directions across recording layer 12A of magnetic medium 12, for example as shown in FIG. 4. The complimentary longitudinal fields from magnetic heads 42 and 44 thus increase longitudinal bias in magnetic medium 12, as compared to a single-head design, while the substantially opposed perpendicular field components reduce perpendicular bias (step 90), as compared to the longitudinal bias.

These steps allows method 80 to erase and format magnetic media 12 with high coercivity recording layers 12A by providing a high longitudinal field strength, for example above about 3 kG, or about 10 kG, where the field from other head configurations is not sufficiently high, for example below about 3 kG. These steps also allow method 80 to fully erase the magnetic medium without generating substantial residual perpendicular bias in the recording layer, so that the read head signals are substantially symmetric, and not subject to bias effects.

In some applications, method 80 also includes controlling a coil current (step 92) to further reduce or minimize perpendicular bias in the recording layer, for example by balancing perpendicular field components $H_{y1}$ and $H_{y2}$ along recording layer 12A of magnetic medium 12. Method 80 may also include positioning magnetic medium 12 and recording layer 12A between magnetic heads 42 and 44 (step 94), for example by actuating positioning guides 56, or aligning the heads (step 96) to adjust the head-media and head-head spacing, for example with actuators coupled to one or both of magnetic head 42 and magnetic head 44.

In the foregoing description, various embodiments of the invention have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. A system comprising:
    a magnetic medium having a recording layer;
    a first magnetic gap adjacent a first side of the magnetic medium, the first magnetic gap generating a first longitudinal field component and a first perpendicular field component;
    a second magnetic gap adjacent a second side of the magnetic medium and opposite the first magnetic gap, the second magnetic gap generating a second longitudinal field component and a second perpendicular field component;
    wherein the first and second longitudinal field components are substantially aligned along the recording layer; and
    wherein the first and second perpendicular field components are substantially opposed across the recording layer;
    wherein the first and second longitudinal field components provide sufficient longitudinal bias to erase data from the recording layer.

2. The system of claim 1, wherein the magnetic medium comprises a perpendicular recording layer.

3. The system of claim 2, wherein the perpendicular recording layer comprises barium ferrite.

4. The system of claim 1, wherein the first and second perpendicular field components provide a net perpendicular bias in the recording layer that is less ten percent of the longitudinal bias in the recording layer.

5. The system of claim 1, wherein the first and second magnetic gaps overlap in a tracking direction along the magnetic medium.

6. The system of claim 1, further comprising a coil coupled to at least one of the first and second magnetic gaps.

7. The system of claim 6, further comprising a coil controller configured to regulate a current to the coil.

8. The system of claim 1, further comprising an actuator configured to position the magnetic medium with respect to the magnetic gaps.

9. The system of claim 1, wherein the first and second magnetic gaps have substantially the same gap length and substantially the same deep gap field.

10. The system of claim 9, wherein the first and second magnetic gaps are substantially aligned across the magnetic medium.

11. The system of claim 9, wherein the recording layer is substantially equidistant between the first and second magnetic gaps.

12. The system of claim 1, further comprising a servo write head for writing a servo track onto the magnetic recording layer.

13. A method for processing a magnetic medium having a recording layer, the method comprising:

positioning a first magnetic head having a first magnetic gap adjacent a first side of the magnetic medium, the first magnetic gap generating a first longitudinal field component and a first perpendicular field component;

positioning a second magnetic head having a second magnetic gap adjacent a second side of the magnetic medium and opposite the first magnetic gap, the second magnetic gap generating a second longitudinal field component and a second perpendicular field component;

generating the first and second longitudinal field components substantially aligned along the recording layer of the magnetic medium with the first and second magnetic heads, wherein complementary longitudinal bias is provided along a recording layer of the magnetic medium; and generating the first and second perpendicular field components substantially opposed across the recording layer of the magnetic medium with the first and second magnetic heads, wherein perpendicular bias is reduced along the recording layer, as compared to the longitudinal bias and the first and second longitudinal field components provide sufficient longitudinal bias to erase data from the recording layer.

14. The method of claim 13, further comprising controlling a coil current for one of the first and second heads to reduce or minimize the perpendicular bias along the recording layer.

15. The method of claim 13, further comprising aligning the first and second magnetic heads across the magnetic medium, such that the first and second magnetic gaps overlap along a tracking direction of the magnetic medium.

16. The method of claim 13, further comprising positioning the recording layer of the magnetic medium substantially equidistant between the two magnetic heads.

17. The method of claim 13, further comprising writing servo data onto the recording layer of the magnetic medium.

18. The method of claim 17, further comprising erasing and formatting the magnetic medium.

19. The method of claim 18, wherein the recording layer comprises barium ferrite.

* * * * *

UNITED STATES PATENT AND TRADEMARK OFFICE
CERTIFICATE OF CORRECTION

PATENT NO. : 8,760,802 B2  Page 1 of 1
APPLICATION NO. : 13/795421
DATED : June 24, 2014
INVENTOR(S) : Stephen J. Rothermel et al.

It is certified that error appears in the above-identified patent and that said Letters Patent is hereby corrected as shown below:

SPECIFICATION

| At | PTO | Should Read |
|---|---|---|
| Col. 8, Line 39 (Equation 4) | "$H_y=H_{y1}+H_{y2}\approx 0$" | -- $H_y=H_{y1}+H_{y2}\approx 0$. -- |
| Col. 8, Line 60 (Equation 5) | " $H_{y1}\left(\frac{H01}{2\pi}\right)$ ," | -- $H_{y1}=\left(\frac{H01}{2\pi}\right)$ -- |
| Col. 9, Line 6 (Equation 4) | " $H_{y2}\left(\frac{H02}{2\pi}\right)$ ," | -- $H_{y2}=\left(\frac{H02}{2\pi}\right)$ -- |
| Col. 9, Line 27 | "fields. $H_1$ and $H_2$" | -- fields $H_1$ and $H_2$ -- |
| Col. 12, Line 20 | "$H_x(max)\ H_0$." | -- $H_x(max)\approx H_0$. -- |

Signed and Sealed this
Ninth Day of September, 2014

Michelle K. Lee
*Deputy Director of the United States Patent and Trademark Office*